United States Patent [19]

Martz et al.

[11] Patent Number: 4,971,837
[45] Date of Patent: Nov. 20, 1990

[54] CHIP RESISTANT COATINGS AND METHODS OF APPLICATION

[75] Inventors: Jonathan T. Martz, Glenshaw, Pa.; Thomas W. Kelly, Bloomington, Ill.; Rostyslaw Dowbenko, Monroeville, Pa.; James A. Meier, St. Saulve, France; Anthony C. Palermo, Gibsonia, Pa.

[73] Assignee: PPG Industries, Inc., Pittsburgh, Pa.

[21] Appl. No.: 333,352

[22] Filed: Apr. 3, 1989

[51] Int. Cl.$^5$ ............................................. B05D 3/02
[52] U.S. Cl. ............................... 422/388.2; 427/407.1; 427/409
[58] Field of Search .................. 427/407.1, 409, 338.2

[56] References Cited

U.S. PATENT DOCUMENTS

| | | | |
|---|---|---|---|
| 3,823,051 | 7/1974 | Chang | 156/99 |
| 3,878,036 | 4/1975 | Chang | 428/424 |
| 4,025,407 | 5/1977 | Chang et al. | 427/444 |
| 4,425,468 | 1/1984 | Makhlouf et al. | 524/710 |
| 4,463,038 | 7/1984 | Takeuchi et al. | 427/407.1 |
| 4,504,374 | 3/1985 | Lewarchik et al. | 627/54.1 X |
| 4,533,717 | 0/1985 | O'Connor et al. | 528/78 |
| 4,544,730 | 10/1985 | O'Connor et al. | 528/78 |
| 4,634,602 | 1/1987 | Sirkoch et al. | 427/44 |
| 4,670,308 | 6/1987 | Knapczyk | 427/350 |

Primary Examiner—Michael Lusignan
Attorney, Agent, or Firm—William J. Uhl; Thomas M. Breininger

[57] ABSTRACT

Disclosed is a liquid coating composition, useful for making a chip resistant coating, comprising a binder of: a first and a second urethane resin each containing terminal, reactive ethylenically unsaturated groups. Each urethane resin is prepared by reacting components comprising (A) an isocyanate-terminated prepolymer which is the product of reacting an organic polyisocyanate with an organic polyol with (B) an isocyanate reactive group-containing unsaturated monomer selected from hydroxyalkyl acrylates, hydroxyalkyl methacrylates and hydroxyalkyl acrylamides. The organic polyol for the first urethane resin has a hydroxyl functionality of 3 or more; the organic polyol for the second urethane resin has a hydroxyl functionality of less than three; and the average functionality of the polyols utilized for the first and second urethane resins is less than three.

Also disclosed is a method of making a cured chip resistant, coating.

13 Claims, No Drawings

CHIP RESISTANT COATINGS AND METHODS OF APPLICATION

BACKGROUND OF THE INVENTION

The invention is directed to chip resistant coatings, more particularly to such coatings having utility in automotive applications.

Stones, gravel, etc. which occasionally hit the protective, exterior coating on an automotive vehicle, can chip and damage the coating resulting in appearance defects as well as a decrease in protection provided by the coating against corrosion, etc. The problem has been of ongoing concern within the automobile manufacturing industry for a considerable period of time.

The present invention is directed to a coating composition, and a process of coating, for forming a first, relatively thick layer of liquid coating composition on a substrate followed by application of a second, different coating composition thereover and hardening and/or curing the compositions of the resulting, composite film together. For greater efficiency, it is desirable that the respective second coating composition be applied to the underlying first coating composition essentially "wet on wet" (i.e., essentially without pre-curing or pre-hardening the underlying coating composition). Also, it is desirable that the underlying first coating composition and the overlying second coating composition be hardened and/or cured together at elevated temperature without generating appearance and integrity defects in the resulting, hardened composite film. These and other objects will become apparent to the reader infra.

SUMMARY OF THE INVENTION

The present invention is for a method of making a chip resistant, coating comprising: (A) applying to a substrate a first layer of from 3 to about 20 mils of a liquid, coating composition; (B) prior to curing the first layer, applying thereover a second layer of a second liquid, organic film-forming, coating composition, and (C) curing the first and second layers together at an elevated temperature sufficient to harden both layers. The liquid coating composition for the first layer comprises, (1) at least one polymer having at least 2 terminal, reactive ethylenically unsaturated groups, and (2) a thermal, free-radical initiator.

The present invention also is for a liquid coating composition, useful for making a chip resistant coating, comprising a binder of: a first and a second urethane resin each having a final free NCO content of from 0 percent to about 20 percent by weight and containing terminal, reactive ethylenically unsaturated groups. Each urethane resin is prepared by reacting components comprising (A) an isocyanate-terminated prepolymer having a final free NCO content ranging from about 0.5 percent to about 30 percent by weight which is the product of reacting an organic polyisocyanate with an organic polyol having an average equivalent weight of from 50 to 1000 with (B) an isocyanate reactive group-containing unsaturated monomer selected from the group consisting of hydroxyalkyl acrylates, hydroxyalkyl methacrylates and hydroxyalkyl acrylamides. The organic polyol for the first urethane resin has a hydroxyl functionality of 3 or more; the organic polyol for the second urethane resin has a hydroxyl functionality of less than three; and the average functionality of the polyols utilized for the first and second urethane resins is less than three.

DETAILED DESCRIPTION OF THE INVENTION

The method of making a chip resistant coating comprises the following steps. First a layer of from 3 to about 20 mils, preferably of from 6 to about 20 mils, of a first, liquid, coating composition is applied to the substrate such as, for example, metal which may previously have been coated with a primer for enhanced corrosion protection. This first, liquid coating composition comprises, (1) at least one polymer, preferably two polymers, having at least 2 terminal, reactive ethylenically unsaturated groups, preferably acrylate or methacrylate groups (collectively referred to herein as (meth)acrylate groups), and (2) a thermal, free-radical initiator. Second, prior to curing the first layer, a layer of a second, liquid, organic film-forming, coating composition, preferably comprising a heat curable, crosslinkable resin, is applied directly over the layer of first, liquid coating composition. Thereafter, the composite film (or coating) from the resulting first and second layers is heated at an elevated temperature sufficient to harden (or cure) both layers. The benefits of the method of the invention are particularly achieved when curing is carried out at a temperature of 82° C. (180° F.) or higher.

It is believed that utilization of polymers having at least two terminal, free-radically reactve, ethylenically unsaturated groups in the coating composition utilized for the thick first layer (i.e., 3 to about 20 mils) allows essentially "wet on wet" direct application of the layer of the second, liquid, organic film-forming, coating composition with subsequent curing of the two layers together without disadvantages associated with the use of coating compositions based, for example, on polymeric organic polyols cured with melamine-formaldehyde resins or on urethane prepolymers having blocked isocyanato groups cured with polymeric polyamines. For example, utilization of urethane prepolymers having blocked isocyanato groups cured with polyamines does not allow for advantageous co-curing of a typical, overlying layer of organic film-forming composition because of yellowing of the overlying coating upon co-curing. On the other hand, utilization of polymeric organic polyols cured with melamine-formaldehyde resins for the first layer allows for co-curing of a subsequently applied ("wet on wet") layer of organic film-forming composition but only at relatively low film builds (for example at dry film thicknesses of less than three mils) believed to result from volatilization of by-products from the melamine-formaldehyde/polyol cure.

In a preferred embodiment for making a thick chip resistant coating, the aforesaid first coating composition comprises a binder containing a mixture of two polymers, each having at least 2 terminal, reactive ethylenically unsaturated groups, preferably (meth)acrylate groups. The ethylenically unsaturated groups are reactive at elevated temperature in the presence of a thermal, free-radical initiator. The aforesaid two polymers of the binder consist of a first and a second urethane resin each having a final free NCO content of from 0 percent to about 20 percent by weight and containing the terminal, reactive ethylenically unsaturated groups, preferably (meth)acrylate groups. Each urethane resin can be prepared by reacting (A) an isocyanate-terminated prepolymer having a final free NCO content ranging from about 0.5 percent to about 30 percent by weight which is the product of reacting an organic polyisocyanate with an organic polyol having an average equivalent weight of from 50 to 1000 with (B) an isocyanate reactive group-containing unsaturated monomer selected from the group consisting of hydroxyalkyl acrylates, hydroxyalkyl methacrylates and hydroxyalkyl acrylamides. The organic polyol for the first urethane resin has a hydroxyl functionality of 3 or more, whereas the organic polyol for the second urethane resin has a hydroxyl functionality of less than three. Moreover, the average hydroxyl functionality of the polyols utilized for the urethane resins in the mixture of the two urethane resins is less than three. Without intending to be bound thereby, it is believed that the combination of the aforesaid two organic polyols having the aforesaid functionalities to provide a mixture of organic polyols having the aforesaid average hydroxyl functionality allows for the preparation of ethylenically unsaturated urethane resins which, in turn, provide an advantageous balance of properties in the resulting, cured thick films such as an excellent combination of flexibility, toughness and impact resistance.

Organic polyisocyanates which may be reacted with organic polyols to prepare the aforesaid urethane resins may be aliphatic, aromatic, cycloaliphatic, or heterocyclic and may be unsubstituted or substituted with groups such as halogen, etc. Aliphatic and cycloaliphatic polyisocyanates are preferred. Many organic polyisocyanates are known, examples of which include: toluene-2,4-diisocyanate toluene-2,6-diisocyanate, and mixtures thereof; diphenylmethane-4,4'-diisocyanate, diphenylmethane-2,4'-diisocyanate and mixtures thereof; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)-fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the organic polyisocyanate.

Examples of organic polyols which may be utilized to prepare the aforesaid urethane resins include: organic polyols in the broad classes such as: (a) simple diols, triols, and higher hydric alcohols; (b) polyester polyols; (c) polyether polyols; (d) amide-containing polyols; (e) acrylic polyols; (f) epoxy polyols; (g) polyhydric polyvinyl alcohols; and (h) urethane polyols. Polyether polyols are preferred.

(a) The simple diols, triols, and higher hydric alcohols are generally known, examples of which include: ethylene glycol; propylene glycol; 1,2-butanediol; 1,4-butanediol; 1,3-butanediol; 2,2,4-trimethyl1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; bis hydroxypropyl hydantoins; tris hydroxyethyl isocyanurate; the alkoxylation product of 1 mole of 2,2-bis(4-hydroxyphenyl)propane (i.e., bisphenol-A) and 2 moles of propylene oxide; and the like.

(b) Polyester polyols are generally known and are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids. Examples of suitable polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol which may be utilized is one prepared by reacting an alkylene oxide such as ethylene oxide, propylene oxide, butylglycidyl ether, and the glycidyl esters of organic acids such as CARDURA-E, with a carboxylic acid to form the corresponding ester.

(c) Polyether polyols are generally known. Polyether polyols are preferred for compositions of the invention employed in the method of the invention. Examples of polyether polyols include the various polyoxyalkylene polyols and mixtures thereof. These can be prepared, according to well-known methods, by condensing an alkylene oxide, or a mixture of alkylene oxides using acid or base catalyzed addition, with a polyhydric initiator or a mixture of polyhydric initiators. Illustrative alklyene oxides include ethylene oxide, propylene oxide, butylene oxide, amylene oxide, aralkylene oxides such as styrene oxide, and the halogenated alkylene oxides such as trichlorobutylene oxide and so forth. The more preferred alkylene oxides include proplyene oxide and ethylene oxide or a mixture thereof using random or step-wise oxyalkylation. Examples of polyhydric initiators include ethylene glycol, propylene glycol, diethylene glycol, dipropylene glycol, trimethylolpropane, triethylolpropane, glycerol, pentaerythritol, sorbitol, dextrose, sucrose methyl glucoside, and the like. Examples of polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of polyether polyols include the generally known reaction products of 1,2-epoxide-containing compounds with polyols such as those included in the description of simple diols, triols, and higher hydric alcohols above.

(d) Amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine, isophorone diamine, 1,8-menthanediamine and the like.

(e) Acrylic polyols include but are not limited to the known hydroxyl-functional addition polymers and copolymers of acrylic and methacrylic acids and their ester derivatives including but not limited to their hydroxyl-functional ester derivatives, acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

(f) Epoxy polyols are generally known and can be prepared, for example, by the reaction of glycidyl ethers of polyphenols such as the diglycidyl ether of 2,2-bis (4-hydroxyphenyl) propane, with polyphenols such as 2,2-bis (4-hydroxyphenyl) propane. Epoxy polyols of varying molecular weights and average hydroxyl functionality can be prepared depending upon the ratio of starting materials used.

(g) Polyhydric polyvinyl alcohols are generally known and can be prepared, for example, by the addition polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

(h) Urethane polyols are generally known and can be prepared, for example, by reaction of an organic polyisocyanate with sufficient polyol to form a hydroxyl functional product. Examples of polyisocyanates useful in the preparation of urethane polyols include those described above. Examples of polyols useful in the preparation of urethane polyols include those described in subsections (a) through (g) above.

The molecular weight of suitable organic polyols for preparation of the aforesaid urethane resins can vary depending on the nature of the specific classes of polyols as described above chosen for prearation of the urethane resins. The hydroxyl equivalent weight of organic polyols suitable for preparation of the urethane resins can vary. However, generally organic polyols having a hydroxyl equivalent weight of from 50 to 1000 are utilized. Typically, the organic polyol having a hydroxyl functionality of 3 or more, for preparation of the first urethane resin has an average equivalent weight of from 50 to 500, preferably of from 150 to 500. Typically, the organic polyol having a hydroxyl functionality of less than 3, for preparation of the second urethane resin has an average equivalent weight of from 50 to 1000, preferably of from 200 to 700. Utilization of organic polyols having too high equivalent weight may tend to result in coatings which do not provide a level of flexibility and impact resistance desirable in chip resistant coatings.

Each of the aforesaid first and second urethane resins for the binder of the aforesaid first coating composition can be prepared by reacting (A) the isocyanate-terminated prepolymer formed by reacting the organic polyisocyanate and the organic polyol with (B) the isocyanate reactive group-containing unsaturated monomer selected from the group consisting of hydroxyalkyl acrylates, hydroxyalkyl methacrylates and hydroxyalkyl acrylamides. The isocyanate-terminated prepolymer can be prepared utilizing generally known procedures. Typically, the reaction between the organic polyisocyanate the organic polyol is accelerated by employing a urethane catalyst, although the reaction may be carried out in the absence of a catalyst. Common urethane catalysts may be used, examples of which include: tertiary amines such as triethylamine or 1,4-diazobicyclo-(2:2:2)octane, and organotin compounds such as stannous octoate and dibutyltin dilaurate. In forming the isocyanate-terminated prepolymer, chain extenders such as those generally known in the polyurethane art may also be employed. Such chain extenders include low molecular weight glycols such as ethylene glycol, butane diol, hexane diol, propylene glycol, bisphenol-A, and the like. Examples of other chain extenders include polyether polyols, or mixtures of polyols, having an average equivalent weight ranging from about 400 to about 4000 and an average functionality of about 2. The amount of chain extender utilized can vary depending upon the amount of polyol reactant used in preparing the isocyanate-terminated prepolymer.

As set forth above, the organic polyol for preparing the aforesaid first urethane resin is selected to provide a hydroxyl functionality of 3 or more, while the organic polyol for preparing the aforesaid second urethane resin is selected to provide a hydroxyl functionality of less than three. Moreover, the relative amounts of organic polyols for preparing the isocyanate-terminated prepolymers for both urethane resins is selected to provide an overall average hydroxyl functionality of less than three.

The urethane resins for the binder of a coating composition of the invention are prepared by reacting the aforesaid isocyanate-terminated prepolymers with an isocyanate reactive group-containing unsaturated monomer selected from hydroxyalkyl acrylates, hydroxyalkyl methacrylates, hydroxyalkyl acrylamides, and mixtures thereof. Examples of the isocyanate reactive group-containing unsaturated monomers include: hydroxyethyl acrylate, hydroxypropyl acrylate, hydroxyethyl methacrylate, hydroxypropyl methacrylate, hydroxyethyl acrylamide, hydroxypropyl acrylamide, butanediol monoacrylate, the adduct of 1 mole of hydroxyethyl acrylate with 2 moles of epsilon-caprolactone, and the like. The reaction is carried out using methods well known in the art and employing such relative proportions of the reactants so as to achieve urethane resins having a final free isocyanate content of from 0 percent to about 20 percent, preferably 0 percent to about 10 percent, and most preferably from about 0 percent to about 5 percent by weight. The combined weight of the first and second urethane resins in a coating composition of the invention generally ranges from 35 percent to 90 percent based on total solids of the coating composition.

In a preferred embodiment, the aforesaid first coating composition additionally contains a monomeric, (meth)acrylate compound having at least 2 (meth)acrylate groups. The monomeric, (meth)acrylate compound serves as a reactive diluent in a composition of the invention. It is preferred that such monomeric compound be relatively nonvolatile at curing temperatures utilized for hardening a coating therefrom on a substrate. While coating compositions of the invention can be obtained having a high solids content (i.e., equal to or greater than 50 percent by weight total solids, preferably equal to or greater than 60 percent by weight total solids) without utilizing such monomeric (meth)acrylate compound, even higher solids compositions, which may be desirable for some purposes, can be achieved employing such monomeric (meth)acrylate compound. Moreover, it is believed that the monomeric (meth)acrylate compound, for example, tetraethyleneglycol dimethacrylate, in preferred compositions of the invention, advantageously allows for even more rapid cure including both cure through the thickness of a thick film and excellent surface cure of the film. The amount of monomeric, (meth)acrylate compound having at least 2 (meth)acrylate groups in a coating composition of the invention generally ranges from 0 percent to 25 percent, preferably from 5 percent to 15 percent, by weight based on total solids of the coating composition.

Examples of the monomeric, (meth)acrylate compounds which may be utilized in a composition of the invention include: tetraethyleneglycol dimethacrylate, 2-phenoxyethyl methacrylate, isodecylmethacrylate, hydroxyethyl methacrylate, trimethylolpropane trimethacrylate, ethyleneglycol dimethacrylate, triethyleneglycol trimethacrylate, the reaction product (adduct) of 3 moles of epsilon-caprolactone and 1 mole of hydroxyethyl methacrylate, and the reaction product (adduct) of 1 mole of the glycidyl ester of versatic acid available as CARDURA-E (from Shell Chemical Co.) with 1 mole of methacrylic acid. Of the aforesaid monomeric (meth)acrylate compounds, tetraethyleneglycol dimethacrylate is preferred. It is to be understood, that while not preferred, other monomeric ethylenically unsaturated compounds such as vinyl toluene and styrene optionally may be employed in a composition of the invention.

A liquid coating composition of the invention is cured at an elevated temperature, typically at a temperature equal to or greater than 180 degrees Fahrenheit (82 degrees Celsius), in the presence of a thermal, free-radical initiator. Suitable thermal, free-radical initiators include peroxides, hydroperoxides, azo compounds, peroxy esters and peroxy ketals. Specific examples of such free radical initiators include: benzoyl peroxide, cumyl peroxide, dicumyl peroxide, methylethyl ketone peroxide, lauryl peroxide, cyclohexanone peroxide, di-t-butyl peroxide, t-butyl-hydroperoxide, t-butylbenzene hydroperoxide, cumene hydroperoxide, azo bis-isobutyronitrile, 2-t-butylazo-2 cyano-4-methylpentane, 4-t-butylazo-4-cyano-valeric acid, t-butyl perbenzoate, t-butyl peroctoate and t-amyl peracetate. Peroxide initiators are preferred. Any suitable catalytic amount of the thermal free-radical initiator may be employed, however, an amount from about 0.5 percent to about 5 percent by weight based on solids typically is utilized.

In a preferred embodiment, a coating composition of the invention additionally comprises a cure-promoting catalyst different from the aforesaid thermal free-radical initiator to promote oxidative cure of a composition of the invention. Typically a metal drier is employed. Examples of metal driers include: manganese carboxylates such as manganese octoate, manganese stearate and mixed manganese octoates and stearates; other metal soaps such as cerium stearate, cobalt stearate and copper stearate; methacryloxy functional zirconium aluminate; and the like. Any suitable amount of such metal drier catalyst may be employed, however, an amount from about 0.5 percent to about 5 percent by weight based on solids typically is utilized.

A coating composition of the invention generally contains one or more pigments and/or fillers (sometimes referred to as extender pigments). The amount of pigment and/or filler generally is selected to provide a pigment to binder ratio of from 0.4:1.1 to 1.1:1.0. It has been found that at pigment to binder ratios higher than 1.1:1.0 the properties of the coating composition which make it particularly suitable as a chip resistant coating for thick film applications tend to decrease. As used herein, the binder is intended to include the urethane resins, the reactive diluent (e.g., the monomeric, (meth)acrylate compound having at least 2 (meth)acrylate groups), but is not intended to include organic solvents and/or diluents, thermal free-radical initiator, metal drier, pigments and/or fillers and rheology modifiers (e.g. microgel). Examples of pigments and/or fillers which may be used in a coating composition of the invention include: titanium dioxide (e.g., rutile or anatase), zinc oxide, zirconius: oxide, zinc sulfide, lithopone, iron oxides, cadmium sulfide, carbon black, phthalocyanine blue, phthalocyanine green, indanthrone blue, ultramarine blue, chromium oxide, burnt umber, benzidine yellow, toluidine red, silicate-treated barium metaborate, strontium chromate, lead chromate, pigmentary silica, barytes, calcium carbonate, barium sulfate, talc, china clay, organoclays such as organo-modified bentone clays, aluminum silicates, sodium aluminum silicates, potassium aluminum silicates, aluminum powder, copper powder, bronz powder, zinc dust, aluminum flakes, nickel flakes, copper flakes, bronze flakes, brass flakes and chromium flakes. The amount of pigments and/or fillers employed a coating composition of the invention generally can range from about 15 percent to about 70 percent, preferably from about 25 percent to about 60 percent by weight based on total solids of the coating composition.

In addition to the above components, a coating composition of the invention may contain additional ingredients which may be employed in their customary amounts for their customary purposes provided they do not seriously interfere with good coatings practice. Examples of these optional ingredients include various plasticizers; antioxidants; mildewcides and fungicides; surfactants; resinous pigment dispersants or grinding vehicles; various flow control agents including, for example, thixotropes and additives for sag resistance and/or pigment orientation based on organic polymer microparticles (sometimes referred to as microgels) described for example in U.S. Pat. Nos. 4,025,474; 4,055,607; 4,074,141; 4,115,472; 4,147,688; 4,180,489; 4,242,384; 4,268,547; 4,220,679; and 4,290,932 the disclosures of which are hereby incorporated by reference; and other such formulating additives. In a preferred embodiment of the invention, a rheology modifier consisting essentially of polymeric organic microparticles which are insoluble in solvents utilized for the coating composition and which have a diameter in the range of from about 0.01 to about 40 microns is employed in the coating composition in an amount typically ranging from about 0.5 percent to about 10.0 percent by weight based on the solids of the composition. Utilization of such polymeric organic microparticles helps reduce intermixing (i.e., increases "hold out") of the subsequently applied layer of the aforesaid second, liquid, organic film-forming, coating composition with the first layer of the aforesaid first, liquid, coating composition of the invention.

Solvent systems may be employed for a coating composition of the invention. The term "solvent system" as used herein is employed in a broad sense and is intended to include true solvents as well as liquid diluents, for example, for the urethane resins utilized in the coating compositions and should be distinguished from the monomeric, (meth)acrylate compounds having at least 2 (meth)acrylate groups (described herein previously) which can be considered to serve as reactive diluents in coating compositions of the invention. The solvent system can comprise a single nonreactive organic solvent or a mixture of nonreactive organic solvents. The relationship between the solvent system and the film-forming resins of the binder depends upon the absolute and relative amounts used. Such factors as solubility, miscibility, polarity, hydrophilicity, hydrophobicity, lyophilicity and lyophobicity are some of the factors which may be considered. Illustrative of suitable components of the solvent system which may be employed are alcohols such as lower alkanols containing 1 to 8 carbon atoms including methanol, ethanol, n-propanol, isopropanol, butanol, sec-butyl alcohol, tertbutyl alcohol, amyl alcohol, hexyl alcohol and 2-ethylhexyl alcohol; ethers and ether alcohols such as ethyleneglycol monoethyl ether, ethyleneglycol monobutyl ether, ethyleneglycol dibutyl ether, propyleneglycol monomethyl ether, diethyleneglycol monobutyl ether, diethyleneglycol dibutyl ether, dipropyleneglycol monomethyl ether, and dipropyleneglycol monobutyl ether; ketones such as methyl ethyl ketone, methyl isobutyl ketone, methyl amyl ketone and methyl N-butyl ketone; esters such as butyl acetate, 2-ethoxyethyl acetate and 2-ethylhexyl acetate; aliphatic and alicyclic hydrocarbons such as the various petroleum naphthas and cyclohexane; and aromatic hydrocarbons such as toluene and xylene. The amount of solvents utilized generally can range from 0 percent to about 30 percent, typically from 0 percent to about 15 percent, and usually from about 5 percent to about 15 percent by weight based on the total weight of coating composition.

As set forth above, the method of the invention involves (A) applying to a substrate a first layer of from 3 to about 20 mils of the first liquid, coating composition containing (1) at least one polymer having at least 2 terminal, reactive ethylenically unsaturated groups, and (2) a thermal, free-radical initiator, (B) prior to curing the first layer, applying thereover a second layer of a second, liquid, organic film-forming, coating composition, and (C) curing the first and second layers together at an elevated temperature sufficient to harden both layers. A wide variety of substrates such as metal, plastic, glass and wood may be used; however, typically the method of the invention is utilized wherein the substrate is a metal substrate of the type used in automotive applications, optionally having thereon a protective primer. A wide variety of liquid, organic film-forming, coating compositions may be utilized for the aforesaid second layer. The second organic-film forming coating composition may be based on thermoplastic and/or crosslinking (e.g., thermosetting) film-forming resins generally known in the art of organic coating compositions. Examples of such film-forming thermoplastic resins and/or thermosetting resins include the generally known cellulosics, acrylics, aminoplasts, urethanes, polyesters, epoxies and polyamides. These resins, when desired, may also contain functional groups characteristic of more than one class, as for example, polyester amides, uralkyds, urethane acrylates, urethane amide acrylates, etc. As indicated above, the film-forming resin for the aforesaid second, organic film-forming coating composition may be thermoplastic or it may be thermosetting. As used herein, the term thermosetting is intended to include not only those resins capable of being crosslinked upon application of heat but also those resins which are capable of being crosslinked without the application of heat. The aforesaid second liquid, organic film-forming, coating composition can be, for example, a primer composition such as, for example, the type often referred to as a "primer surfacer" for use under a subsequently applied topcoating composition, or it may be itself a topcoating composition.

Cellulosics, which may be used in the second organic-film forming coating composition, refer to the generally known thermoplastic polymers which are derivatives of cellulose, examples of which include: nitrocellulose; organic esters and mixed esters of cellulose such as cellulose acetate, cellulose propionate, cellulose butyrate, and cellulose acetate butyrate; and organic ethers of cellulose such as ethyl cellulose.

Acrylic resins, which may be used in the second organic-film forming coating composition, refer to generally known addition polymers and copolymers of acrylic and methacrylic acids and their ester derivatives, acrylamide and methacrylamide, and acrylonitrile and methacrylonitrile. Examples of ester derivatives of acrylic and methacrylic acids include such alkyl acrylates and alkyl methacrylates as ethyl, methyl, propyl, butyl, hexyl, ethylhexyl and lauryl acrylates and methacrylates, as well as similar esters, having up to about 20 carbon atoms in the alkyl group. Also, hydroxyalkyl esters can readily be employed. Examples of such hydroxyalkyl esters include 2-hydroxyethyl acrylate, 2-hydroxypropyl acrylate, 2-hydroxyethyl methacrylate, 2-hydroxypropyl methacrylate, 3-hydroxypropyl-4-hydroxybutyl methacrylate, and mixtures of such esters having up to about 5 carbon atoms in the alkyl group. In some instances, corresponding esters of other unsaturated acids, for example, ethacrylic acid, crotonic acid, and other similar acids having up to about 6 carbon atoms can be employed. Where desired, various other ethylenically unsaturated monomers can be utilized in the preparation of acrylic resins examples of which include: vinyl aromatic hydrocarbons optionally bearing halo substituents such as styrene, alphamethyl styrene, vinyl toluene, alpha-chlorostyrene, alpha-bromostyrene, and para-fluorostyrene; nonaromatic monoolefinic and diolefinic hydrocarbons optionally bearing halo substituents such as isobutylene, 2,3-dimethyl-1-hexene, 1,3-butadiene, chloroethylene, chlorobutadiene and the like; and esters of organic and inorganic acids such as vinyl acetate, vinyl propionate, isopropenyl acetate, vinyl chloride, allyl chloride, vinyl alpha-chloroacetate, dimethyl maleate and the like. The above polymerizable monomers are mentioned as representative of the $CH_2=C<$ containing monomers which may be employed; but essentially any copolymerizable monomer can be used.

Aminoplast resins, which may be used in the second organic-film forming coating composition, refer to the generally known condensation products of an aldehyde with an amino- or amido-group containing substance examples of which include the reaction products of formaldehyde, acetaldehyde, crotonaldehyde, benzaldehyde and mixtures thereof with urea, melamine, or benzoquanimine. Preferred aminoplast resins include the etherified (i.e., alkylated) products obtained from the reaction of alcohols and formaldehyde with urea, melamine, or benzoguanimine. Examples of suitable alcohols for preparing these etherified products include: methanol, ethanol, propanol, butanol, hexanol, benzylalcohol, cyclohexanol, 3-chloropropanol, and ethoxyethanol.

Urethane resins, which may be used in the second organic-film forming coating composition, refer to the generally known thermosetting or thermoplastic urethane resins prepared from organic polyisocyanates and organic compounds containing active hydrogen atoms as found for example in hydroxyl and amino moieties. Some examples of urethane resins typically utilized in one-pack coating compositions include: the isocyanate-modified alkyd resins sometimes referred to as "uralkyds"; the isocyanate-modified drying oils commonly referred to as "urethane oils" which cure with a drier in the presence of oxygen in air; and isocyanate-terminated prepolymers typically prepared from an excess of one or more organic polyisocyanates and one or more organic polyols including, for example, the organic polyols described previously herein. Some examples of systems based on urethane resins typically utilized as two-pack coating compositions include an organic polyisocyanate or isocyanate-terminated prepolymer (first pack) in combination with a substance (second pack) containing active hydrogen as in hydroxyl or amino groups along with a catalyst such as the urethane catalysts described previously herein. The active hydrogen-containing substance in the second pack typically is an organic polyol such as a polyester polyol, a polyether polyol, or an acrylic polyol known for use in such two-pack urethane resin systems. Many coating compositions based on urethanes (and their preparation) are described extensively in Chapter X Coatings, pages 453–607 of *Polyurethanes: Chemistry and Technology. Part II* by H. Saunders and K. C. Frisch, Interscience Publishers (New York, 1964).

Polyester resins, which may be used in the second organic-film forming coating composition, are generally known and are prepared by conventional techniques utilizing polyhydric alcohols and polycarboxylic acids. Examples of suitable polyhydric alcohols and polycarboxylic acids include those set forth previously herein in the description polyester polyols (section (b) above).

Epoxy resins, often referred to simply as "epoxies", which may be used in the second organic-film forming coating composition, are generally known and refer to compounds or mixtures of compounds containing more than one 1,2-epoxy group, i.e., polyepoxides. The polyepoxides may be saturated or unsaturated, aliphatic, cycloaliphatic, aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl(methane; 1,5-dihydroxynaphthalene; 1,1-bis(4-hydroxy-3-allylphenyl)ethane; and the hydrogenated derivatives thereof. The polyglycidyl ethers of polyphenols of various molecular weights may be produced, for example, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone and pyrocatechol.

Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate and isobornyl methacrylate. Many additional examples of epoxy resins are described in the *Handbook of Epoxy Resins,* Henry Lee and Kris Neville, 1967, McGraw Hill Book Company.

When desired, generally known crosslinking agents may be utilized in the second organic-film forming coating composition, particularly when thermosetting resins containing active hydrogen atoms are employed in the coating composition. As will be appreciated by one skilled in the art, the choice of crosslinking agent depends on various factors such as compatibility with the film-forming resin, the particular type of functional groups on the film-forming resin and the like. The crosslinking agent may be used to crosslink the film-forming resin either by condensation or addition or both. When the thermosetting reactants include monomers having complementary groups capable of entering into crosslinking reactions, the crosslinking agent may be omitted if desired. Representative examples of crosslinking agents include blocked and/or unblocked diisocyanates, diepoxides, aminoplasts and phenoplasts. When aminoplast resins are employed as crosslinking agents, particularly suitable are the melamine-formaldehyde condensates in which a substantial proportion of the methylol groups have been etherified by reaction with a monohydric alcohol such as those set forth previously in the description of aminoplast resins suitable for use as film-forming resins in the aforesaid second, liquid, organic film-forming coating composition.

Two preferred embodiments of the method of the invention include those in which (1) the second, liquid, organic film-forming coating composition comprises an organic polyol and an organic polyisocyanate, and (2) the second, liquid, organic film-forming coating composition comprises an organic polyol and an aminoplast resin. Suitable organic polyols include those described previously herein, acrylic polyols and polyester polyols being more preferred.

It is to be understood that in addition to the above components, the second, liquid, organic film-forming coating composition for the method of the invention may contain additional ingredients which may be employed in their customary amounts for their customary purposes, examples of which include pigments and/or fillers as described herein previously, solvents and/or diluents as described herein previously, various plasticizers; antioxidants; mildewcides and fungicides; surfactants; resinous pigment dispersants or grinding vehicles; various flow control agents including, for example, thixotropes and additives for sag resistance and/or pigment orientation based on organic polymer microparticles (sometimes referred to as microgels) described for example in U.S. Pat. Nos. 4,025,474; 4,055,607; 4,074,141; 4,115,472; 4,147,688; 4,180,489; 4,242,384; 4,268,547; 4,220,679; and 4,290,932 the disclosures of which are hereby incorporated by reference; and other such formulating additives.

The following examples illustrate the invention and should not be construed as a limitation on the scope thereof. Unless specifically indicated otherwise, all percentages and amounts are understood to be by weight. Wherever used herein "pbw" means parts by weight.

EXAMPLE 1

This example illustrates the preparation of polyurethane resins containing terminal, reactive ethylenically unsaturated groups for use in the chip resistant coating composition of Example 2. Part (a) involves preparation of the polyurethane resin utilizing an organic polyol having a hydroxyl functionality of two. Part (b) involves preparation of the polyurethane resin utilizing an organic polyol having a hydroxyl functionality of three.

(a) A reaction vessel equipped with a stirrer, thermometer, condenser and nitrogen inlet is charged with 888.0 grams (4.0 mol corresponding to 8.0 equivalents) of isophorone diisocyanate, 385.0 grams of traethyleneglycol dimethacrylate, 1.7 grams of 2,6-di-t-butyl-p-cresol (available from Shell Chemical Company as Ionol), 2000 grams (2.0 mol corresponding to 4.0 equivalents) of a polyether diol (a poly(tetramethyleneoxide) diol having a molecular weight in the range of 950–1050, a hydroxyl number in the range of 53–59, available as TERETHANE 1000 from E.I. DuPont de Nemours and Company), and 3.4 grams of dibutyltin dilaurate. The contents of the vessel are heated to 50.0 degrees Celsius (° C.) at which temperature heating is discontinued and the reaction is allowed to exotherm to ° 70° C. While being stirred, the contents of the vessel are maintained at 70° C. until the isocyanate equivalent is greater than 820. Thereafter, the contents of the vessel are cooled to 50° C. whereupon a mixture of 572.0 grams of hydroxyethyl methacrylate (4.4 mol) and 1.7 grams of Ionol is added to the contents of the reaction vessel, and the temperature again is increased to 70° C. While stirring, the contents of the vessel are maintained at 70° C. until infrared spectral analysis of a sample of the contents of the vessel shows no evidence of isocyanate. The resultant product contains a polyurethane resin having terminal, reactive ethylenically unsaturated groups, in combination with tetraethyleneglycol dimethacrylate. The product has a total solids content measured for 2 hours at 150° C. of 99.3 percent by weight, a viscosity of 33,000 centipoise, and a weight per gallon of 8.82.

(b) A reaction vessel equipped with a stirrer, thermometer, condenser, addition funnel and nitrogen inlet is charged with 1111.6 grams (5.00 mol corresponding to 10.0 equivalents) of isophorone diisocyanate and 1.0 grams (g) of dibutyltin dilaurate and heated to 65° C. A mixture of 593.9 g (5.12 mol) of hydroxyethyl acrylate and 2.8 g of 2,6-di-t-butyl-p-cresol (Ionol from Shell Chemical Company) is added to the reaction vessel over a period of two hours while maintaining the reaction temperature at less than 70° C. After the addition is complete, the contents of the vessel are allowed to stir for one hour after which time 1.8 g of dibutyltin dilaurate is added all at once and 1315.4 g (5.36 equivalents) of NIAX LHT-240 polyol (a polyether triol having a viscosity at 25° C. of about 270 centistokes, an apparent specific gravity at 20/20° C. of about 1.022 and a hydroxyl value of 228.6 available from Union Carbide) is added to the reaction vessel over 1 hour. The addition funnel is rinsed with 320.0 g of xylene and the reaction temperature is raised to 70° C. at which temperature the contents of the vessel are allowed to stir while the reduced viscosity (3 pbw resin/1 pbw xylene) is monitored. After the contents of the vessel reach a Gardner-Holdt bubble tube viscosity of J–K, 60.0 g of n-butanol is added and the contents of the reaction vessel stirred until infrared spectral analysis of a sample of the contents of the vessel shows no evidence of isocyanate. The resultant product contains a polyurethane resin having terminal, reactive ethylenically unsaturated groups. The product has a total solids content measured for 1 hour at 110° C. of 89.6 percent by weight, a viscosity of 113,000 centipoise, and a weight average molecular weight of 3015 and a number average molecular weight of 1199 as determined by gel permeation chromatography utilizing a polystyrene standard.

EXAMPLE 2

This example illustrates advantages of a composition of the invention utilized in the method of the invention.

(a) The formulation of a chip resistant coating composition is as set forth in the following TABLE 1.

TABLE 1

| Coating Composition | Parts by Weight |
|---|---|
| (1) Barytes | 28.65 |
| (2) Titanium dioxide | 3.34 |

TABLE 1-continued

| Coating Composition | Parts by Weight |
|---|---|
| (3) Carbon black | 0.6 |
| (4) Fumed silica[1] | 1.15 |
| (5) Polyurethane resin of Example 1(b) | 22.92 |
| (6) Xylene | 11.27 |
| (7) Tetraethyleneglycol dimethacrylate | 11.45 |
| (8) Polyurethane resin of Example 1(a) | 15.59 |
| (9) Manganese type accelerator[2] | 0.22 |
| (10) Di-t-butyl diperoxy phthalate solution[3] | 1.56 |
| (11) Anti-foaming agent[4] | 0.78 |
| (12) 2,6-di-t-butyl-p-cresol | 0.05 |
| (13) n-propanol | 0.26 |
| (14) Polymeric microparticles[5] | 2.21 |

[1] Available as R-812 Aerosil from DeGussa.
[2] An accelerator containing 12% by weight manganese in combination with fatty acid esters; available as 12% Noury Dry Mn from Interstab Corp.
[3] A 40% by weight solution of di-t-butyl diperoxy phthalate in dibutylphthalate available as Lupersol KDB Pennwalt Corp.
[4] Anti-foaming agent available as Anti-Terra-U from Byk Chemie.
[5] A dispersion of organic polymer microparticles at 44 percent by weight solids in 56 percent by weight of a solvent mixture (containing 30.0 percent of an aliphatic hydrocarbon solvent obtained as ISOPAR E from EXXON Corp. and 70.0 percent heptane). The dispersion of organic polymer microparticles is prepared as follows. A reaction vessel equipped with a stirrer, thermometer, condenser, addition funnel and nitrogen nlet is charged with 630.0 grams (g) of n-heptane and 85.6 g of I sopar E and heated to reflux. A solution of 50.9 g methyl methacrylate, 4.3 g 2,2'-azobis(2-methylbutanenitrile), 99.7 g of a nonaqueous dispersion stabilizer and 184.2 g ISOPAR E is added all at once to the reaction vessel. The light transmission value of the reaction mixture is checked every 10 minutes until the value is 60–70 (n-heptane standard is 100%). Then a solution of 298.7 g methyl methacrylate, 730.4 g ethyl acrylate, 310.4 g hydroxyethyl methacrylate, 43.3 g methacrylic acid, 12.7 g 2,2'-azobis(2-methylbutanenitrile), 253.1 g of the nonaqueous dispersion stabilizer, 3.7 g n-octylmercaptan, 4.2 g dimethylcocoamine, 630.0 g n-heptane, and 269.8 g ISOPAR E is added over 4 hours through the reflux condenser. After the addition is completed, the funnel is rinsed with 51.7 g n-heptane and 22.0 g ISOPAR E. The contents of the vessel are stirred for an additional hour and cooled to ambient temperature. The resultant product has an acid value of 5.87 mg KOH/g; an as residual contents of ethyl acrylate, glycidyl methacrylate and methyl methacrylate, respectively, of 0.95%, 0.01% and 0.03% by weight. The dispersion stabilizer used herein is in the form of a solution containing 40 percent by weight solids and 60 percent by weight of a mixture of solvents. The dispersion stabilizer is a polymer prepared by graft polymerizing 49.5 percent by weight of a reaction product of 10.8 percent by weight of glycidyl methacrylate and 89.2 percent by weight 12-hyoxystearic acid, with 45.4 percent by weight of methylmethacrylate and 4.2 percent by weight of glycidyl methacrylate, wherein the resulting copolymer product containing pendant epoxy groups is reacted with 0.9 percent by weight of methacrylic acid. The mixture of solvents of the dispersion stabilizer solution contains 68.5 percent by weight of butylacetate, 26.3 percent by weight of VM & P naphtha, and 5.2 percent by weight of toluene. The dispersion of organic polymer microparticles epared according to the teachings of U. S. Pat. No. 4,147,688 hereby incorporated by reference.

Components (1) through (7) were premixed followed by the addition with mixing of components (8) through (14) to form the coating composition. A thick layer of the coating composition is spray applied at room temperature to each of three test panels of cold rolled steel having thereon an electrocoated primer composition. Immediately thereafter, while the layer of coating composition of the invention on each panel is wet, a layer of liquid primer surfacer composition is spray applied directly thereto. Next, the resulting composite layers of coatings are heated together for 25 minutes at 285° F. (141° C.) to harden the coatings. Next, a liquid topcoating composition is spray applied to each of the resultant, dry composite coatings and is hardened by heating for 25 minutes at 285° F. (141° C.).

A fourth (control) panel is prepared along with the aforesaid three test panels using the same procedure except that no coating composition of the invention is applied thereto.

Some properties of the resulting hardened composite coatings are as set forth in TABLE 2. The column headings in TABLE 2 have the following meanings.

"DFT CRC" means "dry film thickness in mils of the chip resistant coating of tee invention". It is to be understood that the corresponding "wet film thicknesses" are about 20 percent larger than the dry film thicknesses.

"Adhesion" means cross-hatch adhesion of the entire coating to the substrate with a 10 signifying no loss of adhesion to the substrate during the cross-hatch adhesion test and 0 signifying total loss of adhesion.

"Gravelometer" refers to the results of a Gravelometer test in which five pints of gravel obtained from General Motors Corp. is sprayed at 70 pounds per square inch pressure at the test panel having a temperature of minus 10 degrees Fahrenheit, and thereafter the composite coating on the panel is checked for chipping, a score of 10 indicating "no chipping" and a score of 0 indicating "massive chipping".

"Humidity" refers to the results of a humidity test in which the coated panels are subjected to 100 percent relative humidity at 130 degrees Fahrenheit for 1 week and checked for blistering of the coatings.

"Rust" refers to the results of the inspection of the panels after both the Gravelometer and the Humidity tests have been completed to determine the number of "chipped areas" on each panel which show rusting of the substrate. For example, a number of 22 means that 22 chipped areas were rusted whereas a number of 1 means that only 1 chipped are is rusted.

TABLE 2

| Panel | DFT CRC | Adhesion | Gravelometer | Humidity | Rust |
|---|---|---|---|---|---|
| Control | 0 | 10 | 7 | No blisters | 22 |
| First | 3 | 10 | 7– | No blisters | 14 |
| Second | 4–5 | 10 | 8 | No blisters | 2 |
| Third | 6–7 | 10 | 9 | No blisters | 1 |

As can be seen from the "Rust" results summarized in TABLE 2, the test panels prepared according to the method of the invention utilizing a coating composition of the invention showed substantially less chipped areas that were rusted than the control panel prepared in the same manner except without utilizing the chip resistant coating of the invention.

What is claimed is

1. A method of making a chip resistant, coating comprising:
   (A) applying to a substrate a first layer of from 3 to about 20 mils of a first, liquid, coating composition comprising effective amounts of
      (1) at least one polymer having at least 2 terminal, reactive ethylenically unsaturated groups, and
      (2) a thermal, free-radical initiator,
   (B) prior to curing said first layer, applying thereover a second layer of a second, liquid, organic film-forming, coating composition, and
   (C) curing said first and second layers together at an elevated temperature sufficient to harden both layers.

2. The method of claim 1 wherein said terminal, ethylenically unsaturated groups are (meth)acrylate groups.

3. The method of claim 1 wherein said curing is at a temperature of greater than or equal to 82° C. (180° F.).

4. The method of claim 1 wherein said second, liquid, coating composition comprises a heat curable, crosslinkable composition.

5. The method of claim 1 wherein said first, liquid, coating composition additionally comprises a monomeric, (meth)acrylate compound having at least 2 (meth)acrylate groups.

6. The method of claim 1 wherein said first, liquid, coating composition additionally comprises a cure-promoting catalyst different from said free-radical initiator.

7. The method of claim 6 wherein said cure-promoting catalyst comprises a metal drier.

8. The method of claim 1 wherein said second, liquid, coating composition comprises an organic polyol and an organic polyisocyanate.

9. The method of claim 1 wherein said second, liquid, coating composition comprises an organic polyol and an aminoplast resin.

10. The method of claim 1 wherein said terminal, ethylenically unsaturated groups are (meth)acrylate groups, said second, liquid, coating composition comprises a heat curable, crosslinkable composition; said first, liquid, coating composition additionally comprises a monomeric, (meth)acrylate compound having at least 2 (meth)acrylate groups, and a cure-promoting catalyst different from said free-radical initiator; and said curing is at a temperature of greater than or equal to 82° C. (180° F.).

11. The method of claim 10 wherein said second, liquid, coating composition comprises an organic polyol and an organic polyisocyanate.

12. The method of claim 10 wherein said second, liquid, coating composition comprises an organic polyol and an aminoplast resin.

13. The method of claim 10 wherein said first, liquid, coating compostion is applied at from about 6 to about 20 mils.

* * * * *